United States Patent [19]

Lamb et al.

[11] Patent Number: 4,513,417
[45] Date of Patent: Apr. 23, 1985

[54] AUTOMATIC PROCESSOR RESTART CIRCUIT

[75] Inventors: James S. Lamb, Portland; Warren K. Wimmer, Tigard, both of Oreg.

[73] Assignee: Tektronix, Inc., Beaverton, Oreg.

[21] Appl. No.: 445,342

[22] Filed: Nov. 29, 1982

[51] Int. Cl.³ .............................................. G06F 11/00
[52] U.S. Cl. ........................................ 371/12; 371/5; 371/62
[58] Field of Search .............. 371/12, 5, 62; 328/140, 328/141

[56] References Cited

U.S. PATENT DOCUMENTS

| | | | |
|---|---|---|---|
| 3,568,150 | 3/1971 | Games | 371/5 X |
| 4,061,997 | 12/1977 | Niethammer et al. | 371/5 |
| 4,072,852 | 2/1978 | Hogan et al. | 371/12 |
| 4,304,003 | 12/1981 | Kakizawa et al. | 371/62 |
| 4,317,167 | 2/1982 | Hartig et al. | 371/62 X |
| 4,339,657 | 7/1982 | Larson et al. | 371/5 X |
| 4,355,359 | 10/1982 | Kanegae et al. | 371/62 X |
| 4,408,328 | 10/1983 | Wakai | 371/62 |
| 4,410,991 | 10/1983 | Lenart | 371/12 X |

Primary Examiner—Charles E. Atkinson
Attorney, Agent, or Firm—Allston L. Jones; George T. Noe

[57] ABSTRACT

A restart circuit for a digital processor is disclosed. A regularly serviced processor signal is continuously monitored and if an intermittant soft failure of the processor occurs, causing the processor signal to go high or low or toggle in an irregular fashion, a restart pulse is automatically generated. Thus, with the occurrence of a soft failure, the operator no longer has to manually reset the processor system.

3 Claims, 9 Drawing Figures

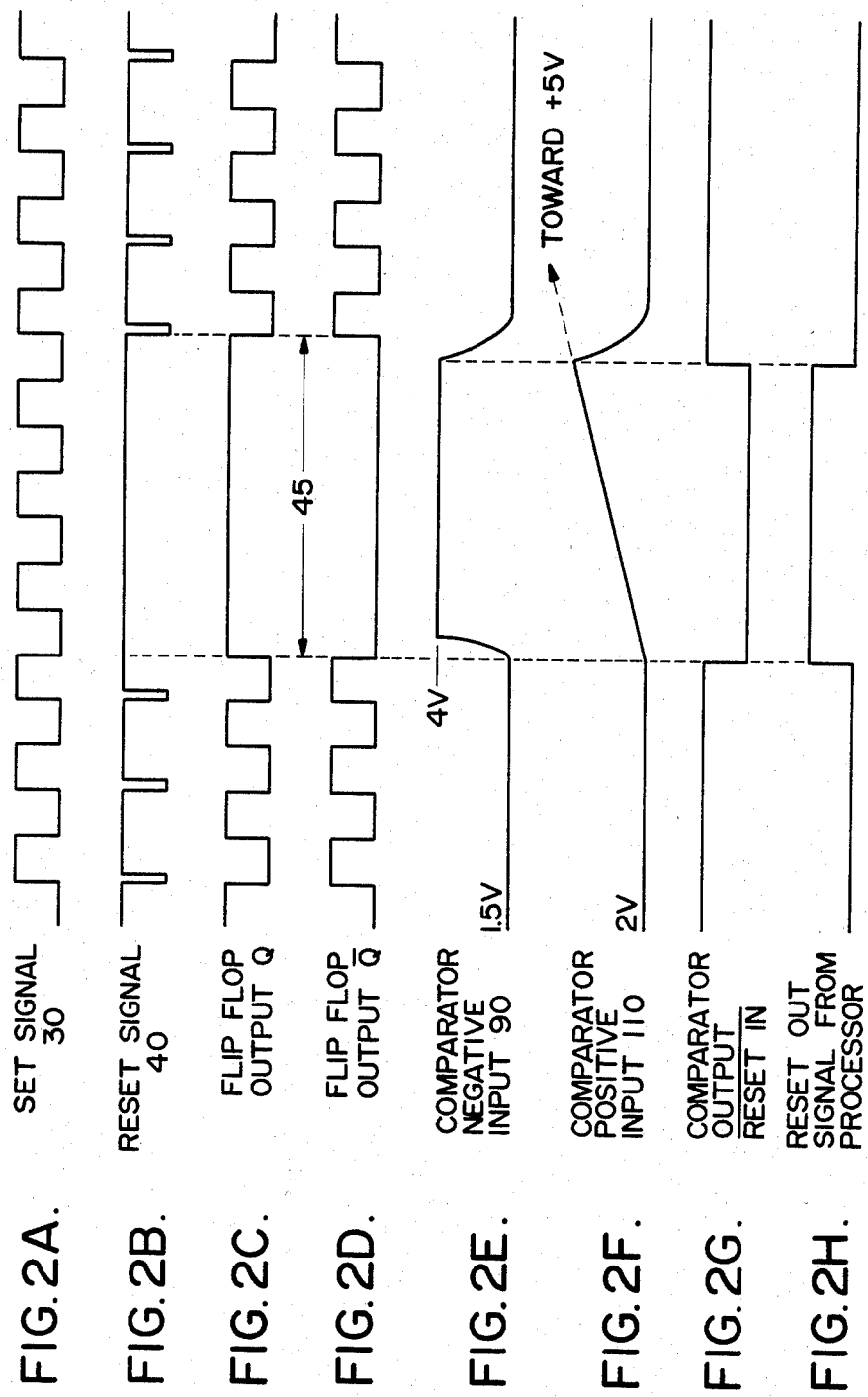

AUTOMATIC PROCESSOR RESTART CIRCUIT

BACKGROUND OF THE INVENTION

Digital processors have gained acceptance in a wide variety of applications. Such processors are very complex devices and as such require the existence of a specific starting state in order to properly execute the program instructions and commands for which they are designed. In general, at initial turn on, the specific starting state is supplied by a power on "reset in" signal generated by logically "ANDing" one or more of the power supply voltages for the processor itself.

For most processors, such as the 8085A microprocessor manufactured by the Intel Corporation, the "reset in" signal must be in the form of a pulse of specific duration depending on the internal characteristics of the processor. Since, after the initial turn on, the power supplies which generate the "reset in" signal normally remain on, the processor itself, or auxiliary circuitry, provides a "reset out" signal which can be used to logically remove the "reset in" signal after the necessary time has elapsed.

For a wide variety of reasons, such as random static discharges, power supply start-up problems, or temporary short circuiting of a data bus by repair personnel, the processor hardware can be temporarily disturbed. Unfortunately, once such a "soft" failure occurs the processor may be unable to resume orderly operation once the disturbance has passed. Such a condition is often referred to as "getting lost" since the processor is unable to resume normal operation unless the power to the entire processor is manually turned off, then back on in order to generate a new "reset in" signal.

SUMMARY OF THE INVENTION

The present invention avoids the need to manually reset the processor in the event that it "gets lost". A reset circuit is disclosed which indirectly monitors the processor's program execution and, if the program is not executed properly, this invention will detect the abnormal condition and generate an automatic hardware restart. Thus, with the occurrence of a soft failure, the operator no longer has to manually reset the processor.

The restart circuit monitors a regularly serviced signal of the processor such as an interrupt signal and generates a D.C. voltage proportional to the duty cycle on this processor's signal line. This D.C. voltage is then compared to a reference voltage by means of an analog comparator. As long as the regularity of the processor signal line is maintained, the comparator output logic signal remains in a first "true" logic state. If the processor signal line duty cycle changes due to a soft failure, the comparator output signal goes to a second or "false" logic state. The false logic state of the comparator in turn is coupled to the processor reset input line to automatically reset the processor. The processor itself, or normal auxiliary circuitry, then generates a "reset out" signal. The circuit of the present invention makes use of this "reset out" signal to not only terminate the "reset in" signal as required for a proper restart but also to provide hysteresis in the comparator circuitry to insure stable operation.

DESCRIPTION OF THE DRAWINGS

FIGS. 2A-2H show the timing signals for the circuit as shown in FIG. 1.

DESCRIPTION OF THE PREFERRED EMBODIMENT

Figure 1:
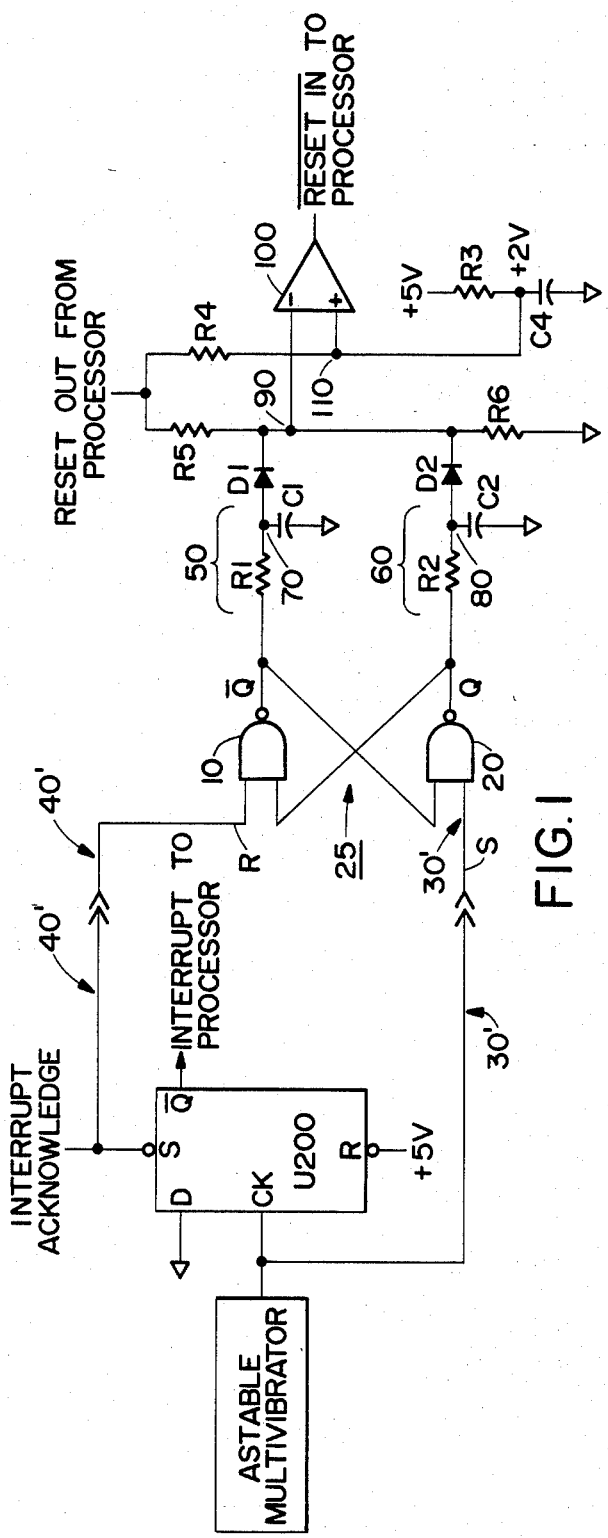
FIG. 1 shows a schematic of the preferred embodiment of a circuit according to the present invention.

FIG. 1 shows an automatic restart circuit according to the present invention. A pair of NAND gates 10 and 20 are cross-coupled to form an R-S flip flop 25. The free input of NAND gate 10 is designated the reset input, R, and the free input of NAND gate 20 is designated the set input, S. A first timing signal, such as the square wave clock signal 30 as shown in FIG. 2A, is applied to the set input, S. A second timing signal such as the normally high pulse signal 40 as shown in FIG. 2B which is regularly serviced by the processor and is synchronous with clock signal 30, is applied to the reset input, R.

The clock signal 30 and pulse signal 40 themselves are normally present in the processor system. For best operation of the automatic restart circuit, clock signal 30 should be a square wave at the same frequency as pulse signal 40 although this is not required so long as whatever timing pattern exists between the two input signals 30 and 40 is constant and repetitive. The following explanation assumes that signals 30 and 40 are in the optimum form and the logic circuit elements are of the TTL logic family.

The output signals of NAND gates 10 and 20, on terminals designated $\overline{Q}$ and Q respectively of flip flop 25, as shown in FIGS. 2C and 2D have the same frequency as the input signals 30 and 40 and also have a 50% duty factor. Resistor R1 and capacitor C1 are coupled to the output $\overline{Q}$ and resistor R2 and capacitor C2 are coupled to the output Q of flip flop 25 with each serving to provide low pass filters 50 and 60 for each of outputs Q and $\overline{Q}$. Since the flip flop outputs Q and $\overline{Q}$ have a 50% duty factor, the low pass filter outputs at nodes 70 and 80 will each be approximately 2.5 volts if the high level output voltage of NAND gates 10 and 20 are +5 volts.

Filters 50 and 60 are both wire "OR" coupled to the negative input 90 of analog comparator 100 via diodes D1 and D2, respectively. Negative input 90 is also connected to ground via resistor R6 and to a normally low reset out signal via resistor R5. The reset out signal, as shown in FIG. 2H, is a processor output signal generated in response to the reset in signal. Thus, because of the forward voltage drops of diodes D1 and D2, and the current through resistors R5 and R6, under normal operation of the processor the voltage at negative input 90 is less than +2 volts.

The positive input 110 of the comparator 100 is connected to the +5 volt supply via resistor R3 and to the reset out signal through resistor R4. Resistors R3 and R4 are selected to provide a voltage to positive input 110 which is greater than the normal operating voltage on the negative input 90. In this example the voltage on input 110 must be equal to or greater than +2 volts. Hence, under normal operation of the processor, the comparator output $\overline{\text{Reset In}}$ signal is in a high logic state as shown in FIG. 2G, as required by the operating processor.

When a soft failure occurs, pulse signal 40 may be held high or low or toggle in an irregular fashion as illustrated by section 45 of FIG. 2B. In any case, the flip-flop 25 will no longer maintain the 50% duty factor signals at outputs Q and $\overline{Q}$. The result is that the average value of either the Q or $\overline{Q}$ signal will rise, increasing the negative input voltage at 90, as shown in FIG. 2E, above the positive input voltage 110, thus causing the comparator 100 output to go low. The low $\overline{\text{Reset In}}$ signal will in turn cause the processor to reset.

The processor in turn will respond by setting the Reset Out signal high as shown in FIG. 2H. Because a capacitor C4 is also connected to the positive input 110, the signal on positive input 110 exponentially increases toward +5 volts as shown in FIG. 2F. When the signal on positive input 110 again exceeds the signal on negative input 90, the output signal of comparator 100 will again go high. Thus, the $\overline{\text{Reset In}}$ signal provides the automatic restart pulse as required for a proper automatic processor restart.

Finally, the Reset Out signal which is connected to the negative input 90 through resistor R5 provides positive feedback for comparator 100. The result is that comparator inputs 90 and 110 are provided with hysteresis to insure the stable operation of the restart circuit.

We claim:

1. A processor restart circuit that monitors a regularly serviced processor signal and automatically provides a reset signal to a processor when the frequency of said regularly serviced processor signal changes, said restart circuit comprising:
   flip-flop means coupled to receive the regularly serviced processor signal for providing an output signal having a duty cycle proportional to the frequency of the regularly serviced processor signal;
   low-pass filter means having an input coupled to an output of said flip-flop means, and an output for providing a voltage proportional to the average value of said output signal of said flip-flop means;
   reference means for providing a reference voltage against which the low-pass filter means output may be compared;
   a comparator having a first input coupled to said output of said low-pass filter means, a second input coupled to said reference means to receive said reference voltage, and an output to provide the reset signal to said processor;
   first reset input means having a first resistor, one end of said first resistor being coupled to said first input of said comparator and the other end being coupled to receive a reset configuration signal from the processor for providing hysteresis for the comparator inputs; and
   second reset input means having a second resistor, one of said resistor being coupled to said second input of said comparator and the other end of said second resistor being coupled to receive a reset configuration from the processor for terminating the reset signal to the processor.

2. A circuit as in claim 1 wherein said flip-flop means output comprises:
   a first output signal port; and
   a second output signal port to provide a logic signal which is the logical inverse of the signal at the first output signal port.

3. A circuit as in claim 2 wherein said low pass filter means comprises:
   a first low pass filter coupled to the first flip-flop output signal port;
   a second low pass filter coupled to the second flip-flop output signal port;
   a first diode having the anode coupled to the output of the first low pass filter; and
   a second diode having the anode coupled to the output of the second low pass filter, the cathodes of each of said first and second diodes are coupled together so that said first and second flip-flop output signals are wire "OR" coupled to said first input of the comparator.

* * * * *